United States Patent
Schwarz et al.

(10) Patent No.: US 6,859,642 B2
(45) Date of Patent: Feb. 22, 2005

(54) CALIBRATION OF SIGNAL STRENGTH MEASUREMENTS IN A CELLULAR COMMUNICATIONS SYSTEM

(75) Inventors: Uwe Schwarz, Veikkola (FI); Sari Korpela, Kauniainen (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/306,839

(22) Filed: Nov. 29, 2002

(65) Prior Publication Data

US 2004/0102158 A1 May 27, 2004

Related U.S. Application Data

(60) Provisional application No. 60/375,813, filed on Apr. 29, 2002.

(51) Int. Cl.[7] .................................................. H04B 7/00
(52) U.S. Cl. ................ 455/67.11; 455/63.1; 455/67.13; 455/452.2; 455/513
(58) Field of Search ................................ 455/67.11, 62, 455/446, 63.1, 435.1, 511, 525, 513, 67.13, 226.2, 423, 67.16, 450, 452.2; 375/227

(56) References Cited

U.S. PATENT DOCUMENTS

| | | | | |
|---|---|---|---|---|
| 4,736,453 A | * | 4/1988 | Schloemer | 455/450 |
| 5,023,900 A | * | 6/1991 | Tayloe et al. | 379/32.01 |
| 5,157,709 A | * | 10/1992 | Ohteru | 455/465 |
| 5,375,123 A | * | 12/1994 | Andersson et al. | 370/333 |
| 5,603,093 A | * | 2/1997 | Yoshimi et al. | 455/63.1 |
| 5,752,164 A | * | 5/1998 | Jones | 455/454 |
| 5,752,165 A | * | 5/1998 | Hokkanen | 455/67.11 |
| 5,970,394 A | * | 10/1999 | Arpee et al. | 455/67.11 |
| 5,978,675 A | * | 11/1999 | Niemela | 455/423 |
| 5,987,306 A | * | 11/1999 | Nilsen et al. | 455/67.11 |
| 6,006,089 A | * | 12/1999 | Sasaki et al. | 455/423 |
| 6,272,325 B1 | * | 8/2001 | Wiedeman et al. | 455/117 |
| 6,480,718 B1 | * | 11/2002 | Tse | 455/446 |
| 6,496,700 B1 | * | 12/2002 | Chawla et al. | 455/435.2 |
| 6,560,442 B1 | * | 5/2003 | Yost et al. | 455/423 |

* cited by examiner

Primary Examiner—Charles Appiah
(74) Attorney, Agent, or Firm—Brown Raysman Millstein Felder & Steiner LLP

(57) ABSTRACT

Signal strength measurements for different frequencies in different cells are calibrated in a cellular communications system. The signal strength of first and second frequencies in at least one cell of a plurality of cells is repeatedly measured. A measurement history is created for said first and second frequencies in at least the one cell. Each measurement history is based on the signal strength measurements of one of the first and second frequencies in the respective one cell. The measurement histories are stored. A respective correction factor is determined for each possible pair of first and second frequencies in at least the one cell. Each correction factor is based on the stored measurement history of the first and second frequencies in the pair. The respective correction factor for a pair of first and second frequencies cell is applied when comparing the signal strength measurements of the first and second frequencies in said pair.

48 Claims, 4 Drawing Sheets

CALIBRATION OF SIGNAL STRENGTH MEASUREMENTS IN A CELLULAR COMMUNICATIONS SYSTEM

This application is related to U.S. Provisional Application No. 60/375,813 filed on Apr. 29, 2002, the specification, appendix and drawings of which are hereby incorporated by reference in their entirety as if fully set forth herein.

BACKGROUND OF THE INVENTION

1. Field of the Invention

The present invention relates generally to cellular communications. More particularly, the present invention relates to signal strength measurements in cellular communications.

2. Description of the Related Art

In wireless communications, signal strength measurements are used to, for example, detect or predict interference between adjacent frequency bands. This detection or prediction may, in turn, be used to trigger various handovers of User Equipment (UE). (The term "adjacent" in this application includes $2^{nd}$ adjacent carriers, $3^{rd}$ adjacent carriers, and optionally includes the guard band separation associated with the carriers in case any one or more of the $2^{nd}$ adjacent carriers, $3^{rd}$ adjacent carriers, and/or guard band separation is interfering too.)

Soft handovers are used to gradually transfer a UE connection from one base station to another base station without the user experiencing any interruption in communications. Hard handovers are used to, for example, switch between different frequencies because of interference, load, etc. Although it may not always be apparent to the user, hard handovers typically involve some interruption in the connection between the UE and the base station(s).

The connection between the UE and the radio access network includes an uplink (UL) connection on a first carrier frequency and downlink (DL) connection on a second carrier frequency different than the first carrier frequency. In conventional cellular communications, there are a plurality of predetermined duplex UL-DL pairs in a frequency band. Interference is minimized by providing a relatively small, constant, fixed offset between the UL and DL frequencies of each 1:1 pair. However, in modern communications, the offsets may be dropped, and the DL and UL frequencies need not be arranged into predefined 1:1 pairs or even into a single frequency band. The DL frequencies, the UL frequencies, or both, may differ significantly and may be in different frequency bands in order to, for example, permit more efficient spectrum utilization.

A large variance in the frequencies used for the DL and UL makes it more difficult to detect or predict interferences and, in turn, to conduct timely handovers or avoid falsely triggered handovers. Two frequencies in the same cell can have different degrees of attenuation. There can be additional cell specific uncertainties such as antenna gains, cable losses, leakage (ACLR) from co-sited adjacent carriers, power amplifier rating, base station power settings, etc. Some of the uncertainties can be difficult to determine even when communications are not occuring.

The lack of accuracy in current interference detection and avoidance methods (i.e., about +/−4–9 dB for RSSI measurements—RSSI=received signal strength indicator) inhibit the efficiency and performance of advanced cellular systems. While the accuracy of the signal strength measurements could be increased by increasing the number of UE measurements such an approach could also lead to degradation in service quality, in network capacity or in network coverage. Another way of increasing the accuracy of the signal strength measurements could be to perform calibration measurements when building/upgrading the network (e.g. measuring the cable loss). This approach would on the other hand drastically increase capital expenditures and operational expenditures in network configuration and updating.

BRIEF SUMMARY

It is an object to provide improvements in the accuracy of interference detection without increasing the number of signal strength measurements. This can be addressed by calibration of the signal strength measurements.

A first aspect of the invention involves a method of calibrating signal strength measurements in cellular communications. The method comprises: repeatedly making signal strength measurements of first and second frequencies in at least one of a plurality of cells; creating a plurality of measurement histories for said first and second frequencies in said at least one cell of said plurality of cells, each one of said plurality of measurement histories based on the signal strength measurements of one of said first and second frequencies in said at least one cell of said plurality of cells; storing said plurality of measurement histories; determining a respective correction factor for each possible pair of first and second frequencies in said at least one of said plurality of cells, each correction factor based on the stored measurement history of the respective first and second frequencies in the pair; and applying the respective correction factor of a pair of first and second frequencies when comparing the signal strength measurements of said first and second frequencies in said pair.

A second aspect of the invention involves a network element for use in a cellular communications system. The network element performs a method of calibrating signal strength measurements from a plurality of cells. The method comprises: receiving signal strength measurements of first and second frequencies in at least one cell of a plurality of cells; creating a plurality of measurement histories for said first and second frequencies in said at least one cell of said plurality of cells, each one of said plurality of measurement histories based on the signal strength measurements of one of said first and second frequencies in said at least one cell of said plurality of cells; storing said plurality of measurement histories; determining a respective correction factor for each possible pair of first and second frequencies in said at least one of said plurality of cells, each correction factor based on the stored measurement history of the respective first and second frequencies in the pair; and applying the respective correction factor of a pair of first and second frequencies when comparing the signal strength measurements of said first and second frequencies in said pair.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

DETAILED DESCRIPTION OF THE PREFERRED EMBODIMENTS

Before beginning a detailed description of the preferred embodiments of the invention, the following statements are in order. The preferred embodiments of the invention are described with reference to an exemplary cellular communication system according to Release 5 of the specifications developed by the 3rd Generation Partnership Project and including an additional extension band at about 2.5 G–2.9 GHz. However, the preferred embodiments are not limited to implementation in a 3GPP cellular system having an additional extension band. They may be practiced in any cellular system. The arrangement and embodiment of the exemplary 3GPP cellular system with an additional extension band is shown in block diagram form and described in this application without excessive detail in order to avoid obscuring the invention, and also in view of the fact that specifics with respect to implementation of such a system are known to those of ordinary skill in the art and may be dependent upon the circumstances. In other words, such specifics are variable but should be well within the purview of one skilled in the art. Where specific details are set forth in order to describe example embodiments of the invention, it should be apparent to one skilled in the art that the invention can be practiced without, or with variation of, these specific details.

Figure 1:
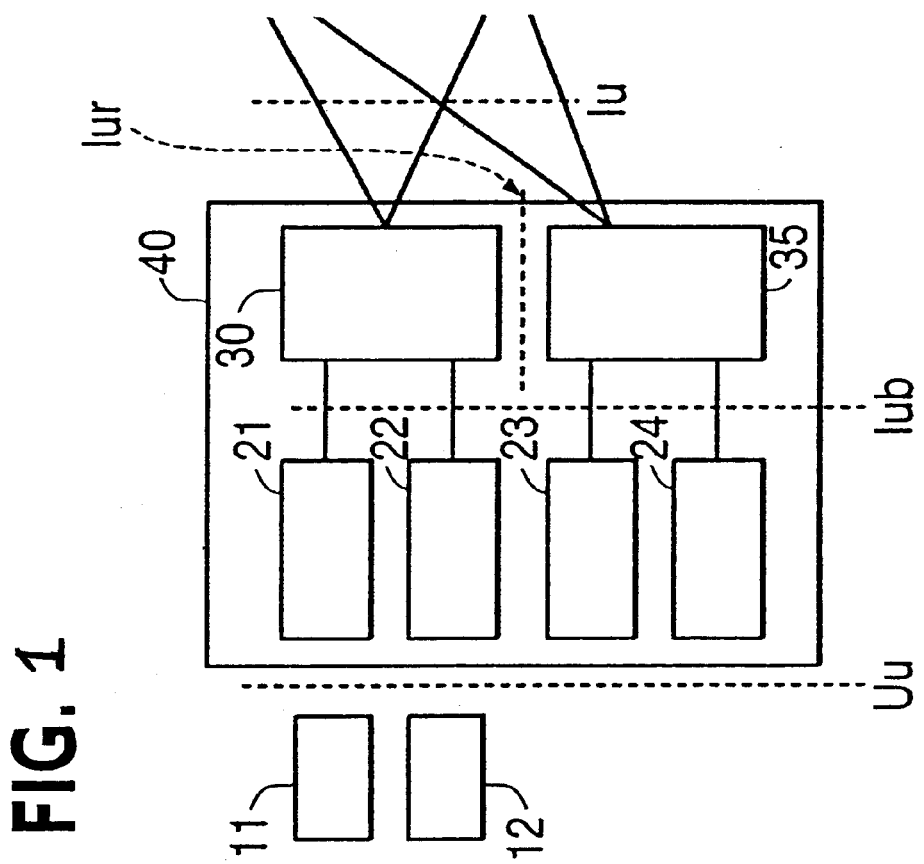
FIG. 1 illustrates an exemplary 3G wireless communication system in which the preferred embodiment of the invention may be practiced.

FIG. 1 is a block diagram of the architecture of an exemplary 3GPP cellular communication system having an additional extension band. First user equipment (UE) 11 and second UE 12 are connected via a Uu radio interface to respective first and second base stations 21, 22 (called Node B in 3GPP specifications) of UTRAN 40. The base stations participate in radio resource signalling and management, and provide the UL and DL connections with UE 11 and 12. UTRAN 40 includes at least one base station controller 30 (called a Radio Network Controller (RNC) in 3GPP specifications) connected to the base station 21, 22 via a Iub interface and is responsible for the management and the control of the radio resources in its domain (i.e., the base station controllers 21, 22 connected to it). RNC 30 may be a service access point for all services the UTRAN 40 provides to a core network (not shown). FIG. 1 also shows a second RNC 35 connected to base stations 23 and 24 via the Iub interface. An Iur interface is provided between RNC 30 and RNC 35. For ease of illustration, only two base station controllers are shown in FIG. 1. There may be, of course, any number of base stations and base station controllers in a mobile communication system.

In U.S. Provisional Patent Application No. 60/375,813 filed on Apr. 29, 2002, applicants presented a feasibility study on the use of WCDMA Frequency Division Duplex (FDD) mode for the additional extension frequency band of 2.5 GHz–2.69 GHz in addition to the existing core band at surrounding 2.1 GHz. An essential element of the preferred interference detection and avoidance techniques in the radio resource management (RRM) for the studied wireless communications involves core band DL RSSI measurements of a UE being connected in the additional 2.5 GHz. The core band RSSI values are then compared to the 2.5 GHz RSSI values to reveal any interference situation(s) in the core band.

Different scenarios for use of the additional extension band are possible. Noting that the extension band is not wide enough to support multiple duplex pairs having the conventional duplex separation of 1900 Mhz, a first scenario is that all of the carriers in the extension band are used only for additional downlink carriers. In such a scenario, UE connections pertaining to one particular core band UL carrier can be carried on one or more than one DL carrier. However, each radio link uses at most one carrier (either in one of the core bands or in the extension band) at any point in time. Variable duplexing may be used to access the additional DL carrier(s) in the extension band outside the core bands. In a second scenario, it is proposed that there be a plurality of sub-bands for UL and DL carriers which are adjacent to each other in the extension band. It is assumed that the (missing) UL part to the FDD (external) DL carriers within the extension band is implemented by using UL carriers from the core bands and variable duplexing. Thus, only existing UMTS core band operators will be able to use that part of the extension band. The UL/DL "internal portions" of the spectrum shall be used by, for example, new (or also possible existing) operators autonomously, i.e., without the necessity to use core band carriers.

It is proposed that the new extension band can be used by UTRAN for load balancing or coverage. In either scenario, the interference detection and escape becomes essential for efficient operation and use of the spectrum.

Figure 2:
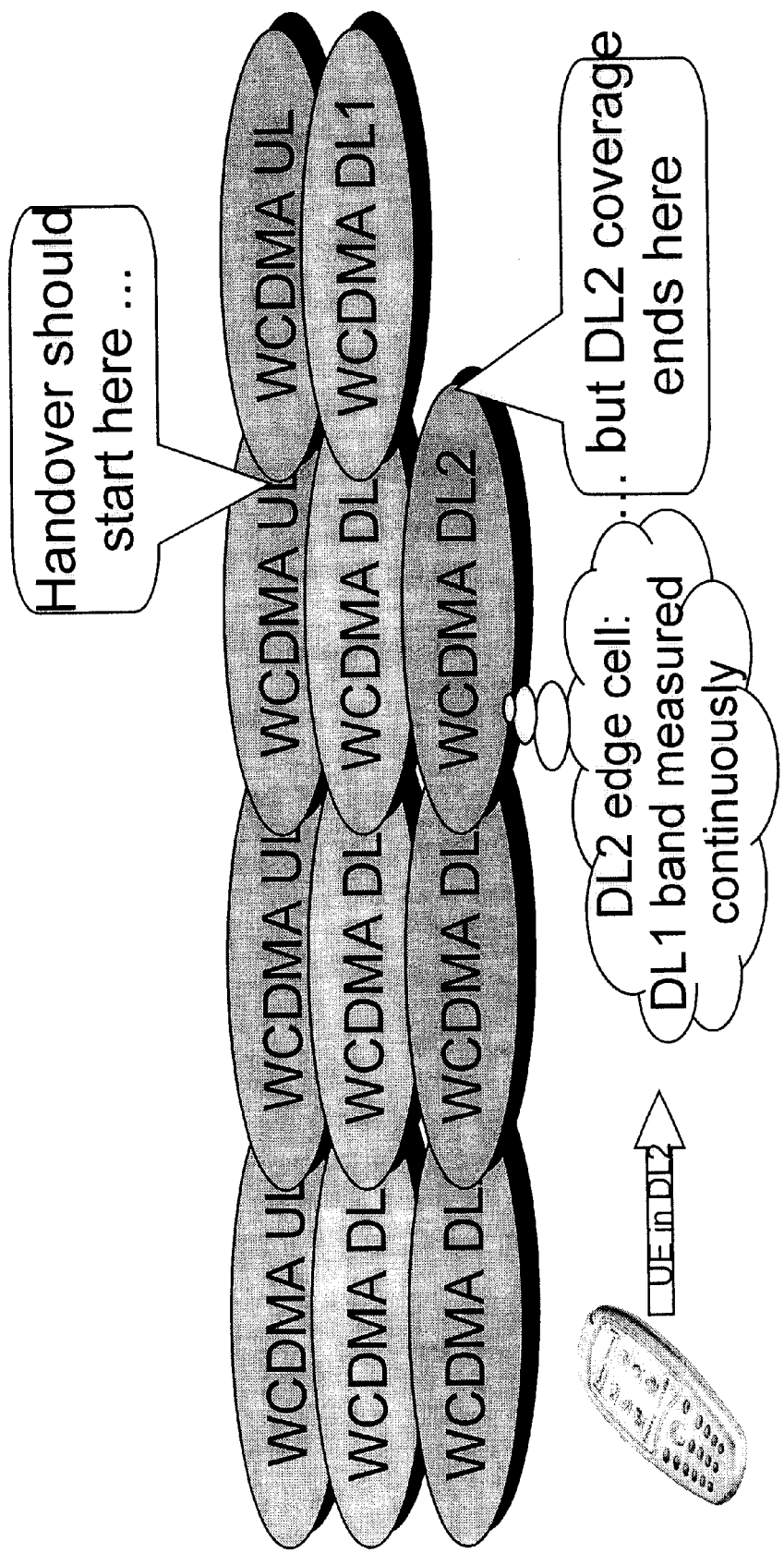
FIG. 2 illustrates the problem of UE-BTS interference in co-located cells.
Figure 3:
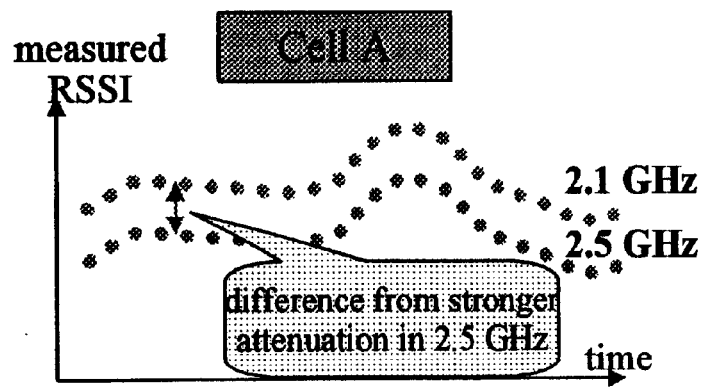
FIG. 3 shows the constant independent offset in the RSSI measurements in a first cell.

The problem of UE-BTS interference in co-located cells is illustrated in FIG. 2. A WCDMA DL2 cell (operating in the 2.5 GHz extension band) can have both WCDMA DL2 neighboring cells and WCDMA DL1 neighboring cells (operating in the 2 GHz core band) at the same time. While normal soft handover procedures are sufficient for a WCDMA DL2 neighboring cell, uplink interference can occur if the mobile is in a border cell of the DL2. As SHO is activated by DL measurements and in border cells at least one DL neighbor is missing, the mobile cannot be in SHO but still gets close to another neighboring basestation (UL neighbor) thus causing interference in UL. SHO areas might be located relatively close to the base station and thus not necessarily relate to high UE Tx power (or BTS Tx power). Thus, normal soft handover triggers and procedures might not be sufficient for a WCDMA UL neighboring cell.

A UE transmitting on a downlink carrier frequency in the extension band as shown in FIG. 2 may have problems in the WCDMA DL2 edge cell. Specifically, it needs to check for SHO areas in the DL1 band to avoid heavy uplink interference. The only way to guarantee avoidance of uplink interference in a DL1 SHO area is to continuously monitor the DL1 band in the cells where needed, i.e., in coverage edge cells. If a SHO area is detected, an interband handover is initiated.

Another similar UL interference can occur with adjacent carriers in the DL1 band (not in FIG. 2). Adjacent carriers don't create SHO areas in DL1 but possibly dead zones in DL1 around the base station of the adjacent carrier. Similary, a mobile in DL2 does not realize these dead zones and might cause UL interference to the base station in the adjacent carrier.

RSSI measurements are preferred over more demanding compressed mode measurements for measuring RSCP as they are fast and thus have less or even no effect on the network's capacity and coverage. Measurements are preferably but not necessarily performed continuously as interference can occur in principle at any distance from the base station location.

Figure 4:
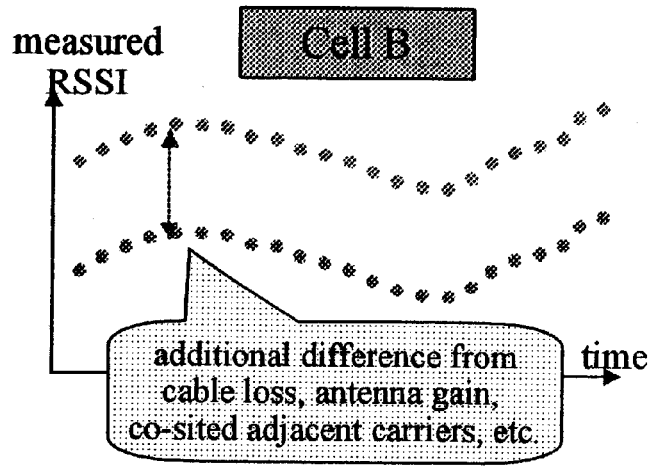
FIG. 4 shows the larger offset in a second cell caused by cable loss, antenna gain, co-sited adjacent carriers, etc.
Figure 5:
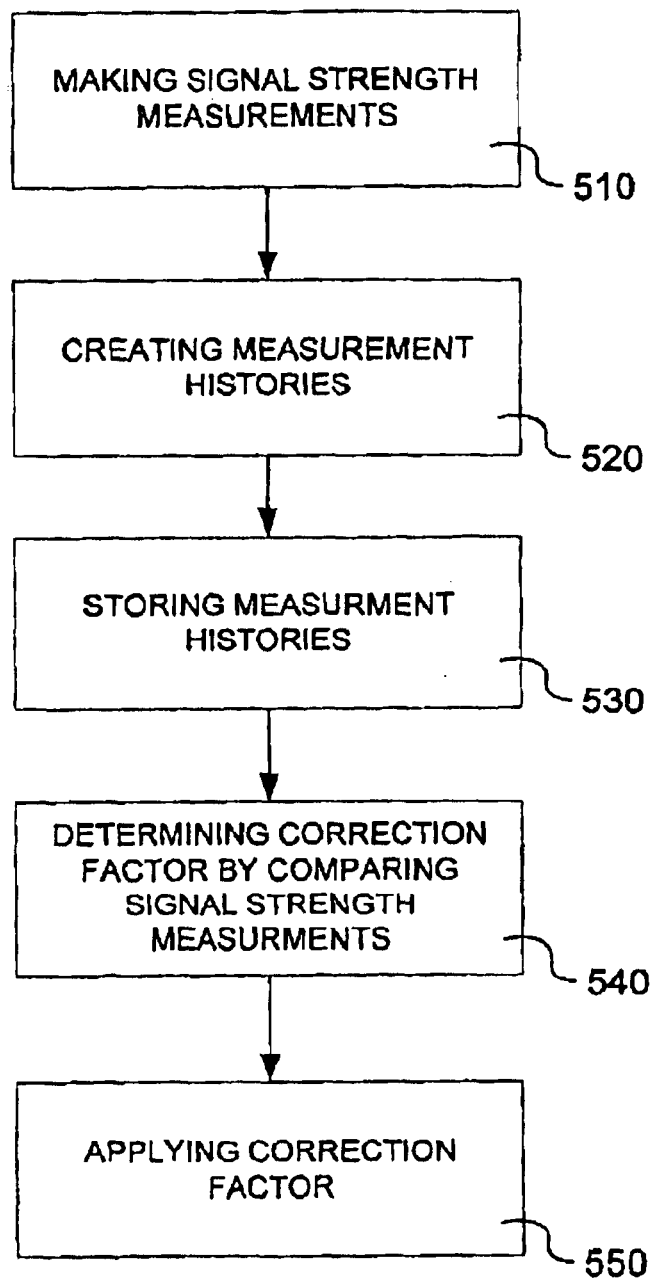

FIGS. 4 and 5 show how the constant offset between measured RSSI values varies from cell to cell due to cell specific uncertainties. FIG. 4 shows the constant independent offset in the RSSI measurements in a first hypothetical Cell A resulting from the stronger attenuation at 2.5 GHz. FIG. 5 shows a larger offset in the RSSI measurements in a second hypothetical Cell B. It is indicated that the larger offset may be the result of, for example, cable loss, antenna gain, co-sited adjacent carriers, etc.

In the preferred embodiments of the invention, UE 11 measures the DL carriers in both frequency bands and reports the signal strength measurements to base station controller 30 (or alternatively to base station 21, 22 only). The base station controller(s) 30 has knowledge of the loading of the corresponding cells and the measurement history. It can make the comparison of the reported signal strength measurements and learn from the previous measurements to provide for the calibration of subsequent signal strength measurements. The calibration can be long term or short term. In other words, the average of any number of signal strength measurements in the measurement history can be determined and the average only provided to perform the calibration. Furthermore, the calibration can be automatically performed or it can be semi-automatically performed (meaning that some user or other external input is required to perform the calibration procedure, such as an input to initiate the calibration procedure).

The trigger when to verify interference detection and when to initiate an escape handover is located in the network, preferably in base stations 21, 22 or base station controller 30. A key consideration in locating the trigger is the capacity to keep track of the measurement history. Indeed, the calibration procedure can be performed in any one of, or split among, several different network elements. It may be performed in the UE, the base station, the base station controller or any combination thereof.

Various requirements can be set up to guarantee accuracy in interference detection and avoidance. The requirements preferably include DL load measurements of some type.

The comparison of RSSI values can take this offset into account to increase the accuracy of interference detection. An example equation is as follows:

$$RSSI_{2.1GHz} = RSSI_{2.5\ GHz} + (DLTxPwr_{2.1\ GHz} - DLTxPwr_{2.5\ GHz}) + 2.57dB + \text{cell specific correction factor}$$

The equation term "$(DLTxPwr_{2.1\ GHz} - DLTxPwr_{2.5\ GHz})$" reflects the RSSI variation due to changing load. The 2.57 dB adjustment is a commonly accepted figure for attenuation in the 2.5 GHz. Of course, other attenuation adjustment amounts may be used as well. The cell specific correction factor is determined based on previous measurements. The determination may be automatic or semi-automatic. If $RSSI_{2.1}$ GHz exceeds the right hand term in the equation, it may be determined that UL interference in the core band is likely to occur due to a dead zone (ACI) or a SHO area not repeated in the 2.5 GHz band. Preferably, but not necessarily, a minimum threshold could be established for the excess. Also, the interference can be verified with a second step measurement.

In an alternative embodiment, the comparison or at least a part of it is located in UE 11. For example, UE 11 may report only the difference between the two measured RSSI values and not the measurements themselves. As yet another option, UE 11 may perform any part or all of the above equation or any other equation utilized to detect interference. Also, UE 11 may start reporting only with a certain minimum difference in RSSI measurement values or interference detection calculation.

In another alternative, the calibration can be made UE specific. Different UEs can have different RSSI measurement accuracies. A first UE may be more sensitive or accurate (or less sensitive or accurate) to different downlink frequencies than a second UE. Thus, the UE can perform UE/call specific calibration to permit fine tuning of sensitivities and inaccuracies among different UEs. The UE specific calibration may be performed instead of cell specific calibration or it may be performed in addition to and simultaneous with the cell specific calibration.

Furthermore, any of the above described embodiments can be modified to include pre-tuning of already known fixed RSSI value offsets. This pre-tuning may be accomplished in any number of different ways.

In each of the preferred embodiments, past RSSI measurements are utilized to increase the accuracy of interference detection and, at the same time, reduce the number of needed inter-band measurements. Higher detection accuracy in turn provides better time handovers and avoids falsely triggered handovers. The measurement results are automatically calibrated after learning from the previous measurements of the UEs 11. This automatic calibration saves both capital expenditures and operational expenses.

What is claimed claim:

1. A method of calibrating signal strength measurements in cellular communications, comprising:
   repeatedly making signal strength measurements of first and second frequencies in at least one cell of a plurality of cells;
   creating a plurality of measurement histories for said first and second frequencies in said at least one cell of said plurality of cells, each one of said plurality of measurement histories based on the signal strength measurements of one of said first and second frequencies in said at least one cell of said plurality of cells;
   storing said plurality of measurement histories;
   determining a respective correction factor for each possible pair of first and second frequencies in said at least one of said plurality of cells by comparing the signal strength measurements of said first and second frequencies in said pair, each correction factor based on the stored measurement history of the respective first and second frequencies in the pair; and
   applying the respective correction factor of said pair of first and second frequencies.

2. A method in accordance with claim 1, wherein the first and second frequencies are downlink frequencies, and the first frequency is in a different band than the second frequency.

3. A method in accordance with claim 2, wherein said different band is an additional extension band including frequencies of at least 2.5 GHz.

4. A method in accordance with claim 2, wherein the first downlink frequencies and the second downlink frequencies have the same cell coverage.

5. A method in accordance with claim 1, in which the signal strength measurements are RSSI measurements.

6. A method in accordance with claim 1, in which a correction factor is separately determined for each call made by a mobile terminal.

7. A method in accordance with claim 1, wherein the measurement histories are stored in a base station or base station controller.

8. A method in accordance with claim 6, wherein the signal strength measurements of the first and second frequencies are made in a User Equipment and reported to the base station or base station controller.

9. A method in accordance with claim 6, wherein the base station or base station controller also has knowledge of the loading of the cells corresponding to the measurement histories.

10. A method in accordance with claim 6, wherein said base station or base station controller automatically determines the respective correction factors for the plurality of cells and triggers verification of interference detection.

11. A method in accordance with claim 10, wherein verification is triggered in accordance with the equation:

$$RSSI_{2.1\ GHz} = RSSI_{2.5\ GHz} + (DL\ TxPwr_{2.1\ GHz} - DL\ TxPwr_{2.5GHz}) + \text{attenuation}_{2.5\ GHz} + \text{cell}$$

specific correction factor where the term "(DL TxPwr$_{2.1\ GHz}$–DL TxPwr$_{2.5\ GHz}$)" reflects the signal strength variation due to changing load, the term "attenuation$_{2.5\ GHz}$" is a fixed offset attributable to the attenuation at 2.5 GHz, and the term "cell specific correction factor" is automatically determined based on the measurement history for said first and second frequency of the cell.

12. A method in accordance with claim 11, wherein the attenuation offset is fixed at substantially 2.57 dB.

13. A method in accordance with claim 11, wherein interference detection verification is triggered if $RSSI_{2.1\ GHz}$ exceeds the right hand term in the equation.

14. A method in accordance with claim 6, wherein the UE compares the signal strength measurements of the first and second frequencies, and reports only the difference between the measurements to the base station or base station controller.

15. A network element in accordance with claim 14, in which the signal strength measurements are RSSI measurements.

16. A network element in accordance with claim 14, wherein the signal strength measurements of the first and second frequencies are made in a User Equipment.

17. A network element in accordance with claim 14, wherein the network element is a base station controller, base station or other network element capable of performing the method.

18. A network element in accordance with claim 14, wherein said network element automatically determines the respective correction factors for the plurality of cells and triggers verification of interference detection.

19. A network element in accordance with claim 18, wherein verification is triggered in accordance with the equation:

$$RSSI_{2.1\ GHz} = RSSI_{2.5\ GHz} + (DL\ TxPwr_{2.1\ GHz} - DL\ TxPwr_{2.5\ GHz}) + \text{attenuation}_{2.5\ GHz} + \text{cell}$$

specific correction factor where the term "(DL TxPwr$_{2.1\ GHz}$–DL TxPwr$_{2.5\ GHz}$)" reflects the signal strength variation due to changing load, the term "attenuation$_{2.5\ GHz}$" is a fixed offset attributable to the attenuation at 2.5 GHz, and the term "cell specific correction factor" is automatically determined based on the measurement history of the cell.

20. A network element in accordance with claim 19, wherein the attenuation offset is fixed at substantially 2.57 dB.

21. A network element in accordance with claim 19, wherein interference detection verification is triggered if $RSSI_{2.1\ GHz}$ exceeds the right hand term in the equation.

22. A network element in accordance with claim 14, wherein the network element receives only the difference between the signal strength measurements.

23. A mobile terminal in accordance with claim 22, wherein the first and second frequencies are downlink frequencies, and the first frequencies are in a different band than the second frequencies.

24. A mobile terminal in accordance with claim 22, wherein the first downlink frequencies and the second downlink frequencies have the same cell coverage.

25. A mobile terminal in accordance with claim 22, in which the signal strength measurements are RSSI measurements.

26. A mobile terminal in accordance with claim 22, wherein the calibration method is automatically performed.

27. A mobile terminal in accordance with claim 22, wherein the calibration method is semi-automatically performed.

28. A mobile terminal in accordance with claim 22, wherein the mobile terminal provides only the signal strength measurements to a base station.

29. A mobile terminal in accordance with claim 22, wherein the information relating to the signal strength measurements comprises the difference between the signal strength measurements to a base station.

30. A mobile terminal in accordance with claim 29, wherein the information relating to signal strength measurement histories comprises an average value of the signal strength measurements in each signal strength measurement history.

31. A mobile terminal in accordance with claim 22, wherein the information relating to the signal strength measurements comprises information relating to signal strength measurement histories.

32. A network element for use in a cellular communications system, said network element performing a method of calibrating signal strength measurements from a plurality of cells, said method comprising:

receiving signal strength measurements of first and second frequencies in at least one cell of a plurality of cells;

creating a plurality of measurement histories for said first and second frequencies in said at least one cell of said plurality of cells, each one of said plurality of measurement histories based on the signal strength measurements of one of said first and second frequencies in said at least one cell of said plurality of cells;

storing said plurality of measurement histories;

determining a respective correction factor for each possible pair of first and second frequencies in said at least one of said plurality of cells by comparing the signal strength measurements of said first and second frequencies in said pair, each correction factor based on the stored measurement history of the respective first and second frequencics in the pair; and applying the respective correction factor of a pair of first and second frequencies.

33. A network element in accordance with claim 32, wherein the first and second frequencies are downlink frequencies, and the first frequency is in a different band than the second frequency.

34. A network element in accordance with claim 32, wherein said different band is an additional extension band including frequencies of at least 2.5 GHz.

35. A network element in accordance with claim 32, wherein the first downlink frequencies and the second downlink frequencies have the same cell coverage.

36. A mobile terminal for use in a cellular communications system, said mobile terminal calibrating signal strength measurements, said calibration method comprising:

making repeated signal strength measurements of a plurality of first frequencies and a plurality of second frequencies;

providing information relating to said signal strength measurements to a base station;

receiving respective correction factors from a base station for each possible pair of first and second frequencies by comparing the signal strength measurements of said first and second frequencies, each respective correction factor based on said information relating to said signal strength measurements provided to said best station; and applying the respective correction factor received for a pair of first and second frequencies.

37. A mobile terminal in accordance with claim 36, wherein said different band is an additional extension band including frequencies of at least 2.5 GHz.

38. A cellular communications network, said network performing a method of calibrating signal strength measurements from at least one cell of a plurality of cells, said network comprising:

at least one mobile terminal, said at least one mobile terminal making repeated signal strength measurements of a plurality of first frequencies and a plurality of second frequencies; and a base station in said at least one cell, said base station receiving information relating to said signal strength measurements from said at least one mobile terminal, wherein said network performs a calibration method comprising;

creating a plurality of measurement histories for said first and second frequencies in said at least one cell of said plurality of cells by comparing the signal strength measurements of said first and second frequencies, each one of said plurality of measurement histories based on the signal strength measurements of one of said first and second frequencies in said at least one cell of said plurality of cells;

storing said plurality of measurement histories;

determining a respective correction factor for each possible pair of first and second frequencies in said at least one of said plurality of cells, each correction factor based on the stored measurement history of the respective first and second frequencies in the pair; and applying the respective correction factor of a pair of first and second frequencies.

39. A network in accordance with claim 38, wherein the first and second frequencies are downlink frequencies, and the first frequencies are in a different band than the second frequencies.

40. A network in accordance with claim 38, wherein said different band is an additional extension band including frequencies of at least 2.5 GHz.

41. A network in accordance with claim 38, wherein the first downlink frequencies and the second downlink frequencies have the same cell coverage.

42. A network in accordance with claim 38, in which the signal strength measurements are RSSI measurements.

43. A network in accordance with claim 38, wherein the calibration method is automatically performed.

44. A network in accordance with claim 38, wherein the calibration method is semi-automatically performed.

45. A network in accordance with claim 38, wherein the mobile terminal provides only the signal strength measurements to a base station.

46. A network in accordance with claim 38, wherein the information relating to the signal strength measurements comprises the difference between the signal strength measurements to a base station.

47. A mobile terminal in accordance with claim 38, wherein the information relating to the signal strength measurements comprises information relating to signal strength measurement histories.

48. A mobile terminal in accordance with claim 47, wherein the information relating to signal strength measurement histories comprises an average value of the signal strength measurements in each signal strength measurement history.

* * * * *